United States Patent [19]

Floyd et al.

[11] Patent Number: 5,055,541
[45] Date of Patent: Oct. 8, 1991

[54] STARCH POLYMER GRAFT COMPOSITION AND METHOD OF PREPARATION

[75] Inventors: William C. Floyd, Chester; Louis R. Dragner, Rock Hill; Blanche H. Black, York; Bernard F. North, Rock Hill, all of S.C.

[73] Assignee: Sequa Chemicals, Inc., Chester, S.C.

[21] Appl. No.: 371,988

[22] Filed: Jun. 27, 1989

[51] Int. Cl.$^5$ ............................................. C08G 89/00
[52] U.S. Cl. ................................... 527/300; 527/313; 527/314
[58] Field of Search ........................ 527/300, 313, 314

[56] References Cited

U.S. PATENT DOCUMENTS

| | | | |
|---|---|---|---|
| 3,061,471 | 10/1962 | Brockway et al. | 428/395 |
| 3,061,472 | 10/1962 | Brockway | 427/392 |
| 3,785,921 | 1/1974 | Ide et al. | 162/168 |
| 4,011,392 | 3/1977 | Rudolph et al. | 527/309 |
| 4,380,600 | 4/1983 | Hosoda et al. | 524/458 |
| 4,487,864 | 12/1984 | Bermudez et al. | 524/2 |
| 4,568,721 | 2/1986 | Fong et al. | 525/54.26 |
| 4,616,057 | 10/1986 | Lindemann et al. | 524/458 |
| 4,678,824 | 7/1987 | Lauria | 524/48 |
| 4,695,606 | 9/1987 | Floyd et al. | 525/163 |

FOREIGN PATENT DOCUMENTS

| | | |
|---|---|---|
| 0000247 | 1/1979 | European Pat. Off. . |
| 0147380 | 7/1985 | European Pat. Off. . |
| 55-161806 | 12/1980 | Japan . |
| 186438 | 11/1981 | Japan . |
| 62891K | 5/1983 | Japan . |
| 0809745 | 3/1959 | United Kingdom . |
| 2075537 | 11/1981 | United Kingdom . |

OTHER PUBLICATIONS

E. B. Gagley et al., "Graft Copolymers of Polysaccharides with Thermoplastic Polymers. A New Type of Filled Plastic", May 1977, Polymer Engineering and Science, vol. 17, No. 5.

George F. Fanta et al., "Grafted Starches", 1986 (Chapter 10); Modified Starches: Properties and Uses, ed. O. B. Wurzburg, CRC Press, Inc.

Gugliemelli et al., "Preparation of Soapless Latexes by Sonification of Starch-Based Poly(isoprene-co-acrylonitrile) Graft Reaction Mixtures", Journal of Applied Science, vol. 23, 635–644 (1979).

"Preparation of Starch Poly(Styrene-co-acrylonitrile) Graft Polymers by Cerium(IV) Initiation", Polymer Letters Edition, vol. 15, pp. 739–743 (1977).

*Primary Examiner*—Nathan M. Nutter
*Attorney, Agent, or Firm*—Mitchell D. Bittman

[57] ABSTRACT

Monomers such as hydrophobic olefinically unsaturated monomers have been grafted onto maltodextrins and other low molecular weight starch hydrolyzates to prepare stable fluid emulsions of coatable viscosity and reduced graininess. Polymer films of high tensile strength which are useful in a variety of applications, including high temperature applications may be formed by casting and drying these emulsions.

46 Claims, 2 Drawing Sheets

STARCH POLYMER GRAFT COMPOSITION AND METHOD OF PREPARATION

The present invention relates to starch-polymer grafts, and particularly to low molecular weight starch hydrolyzates such as maltodextrins having one or more monomers grafted thereto.

The grafting of monomers onto starch has been known for some time. See, for instance, U.S. Pat. Nos. 3,061,471 and 3,061,472. These result in what may be referred to as starch graft compounds. One problem with compositions comprising such compounds is the difficulty of maintaining such compositions thoroughly dispersed in solution in such a manner that they may be easily coated onto substrates. It is often necessary to utilize surfactants in order to maintain such emulsions, and surfactants reduce the surface tension of the emulsion and may diminish the overall quality of polymeric films formed by casting and drying the emulsions. Moreover, prior art starch-polymer grafts emulsions display undesirable graininess, which is undesirable in the polymer films and/or have a tendency to gel, precipitate or thicken considerably, or otherwise display poor stability over time.

There is therefore a need for storage stable, fluid coatable emulsions which may be maintained in a manner which does not overly diminish the desired characteristics of polymer films formed therefrom, such as the characteristics of tensile strength, resistance to elongation, temperature stability and the like. Temperature stability is particularly important in such applications as roofing products intended for hot asphalt impregnation, as well as other high temperature applications.

SUMMARY OF THE INVENTION

It is accordingly an object of the present invention to provide new starch-polymer grafts.

It is another object of the invention to provide stable, fluid emulsions of such grafts which resist precipitation and gelling over time.

It is another object of the invention to provide emulsions of starch-polymer grafts which display minimal graininess and precipitation.

It is another object of the invention to provide polymeric films prepared from emulsions of the novel starch-polymer grafts disclosed herein.

It is yet another object of the invention to provide polymeric films having high tensile strength and good resistance to elongation.

It is yet another object of the invention to provide polymer films which perform well at high temperatures.

These and other objects are accomplished by providing a starch-polymer graft composition and method of preparing such composition. The starch is a hydrolyzate having a water solubility in excess of 80% by weight at 25° C., preferably at least 86%, and a viscosity equivalent to a DE (Dextrose Equivalent) of 1-20, preferably 1-10 and includes at least one graft site where at least one monomer is bound to said starch hydrolyzate to form a starch-polymer graft compound, wherein the number of graft sites per mole of starch is in excess of about 1 millimole, preferably at least 10 millimoles, and wherein in the grafting reaction ring cleavage occurs between carbons 2 and 3 of the anhydro-glucose ring of the starch hydrolyzate. The invention further provides a stable, fluid aqueous emulsion of the starch-polymer graft without the use of surfactants and contains small particles in which agglomeration, coagulation and precipitation is inhibited.

In a preferred embodiment of this invention, maltodextrins, preferably maltodextrins having a dextrose equivalent of between about 2 and 10 are utilized as the starch hydrolyzate onto which one or more hydrophobic monomers are grafted.

DETAILED DESCRIPTION OF THE INVENTION

Figure 1:
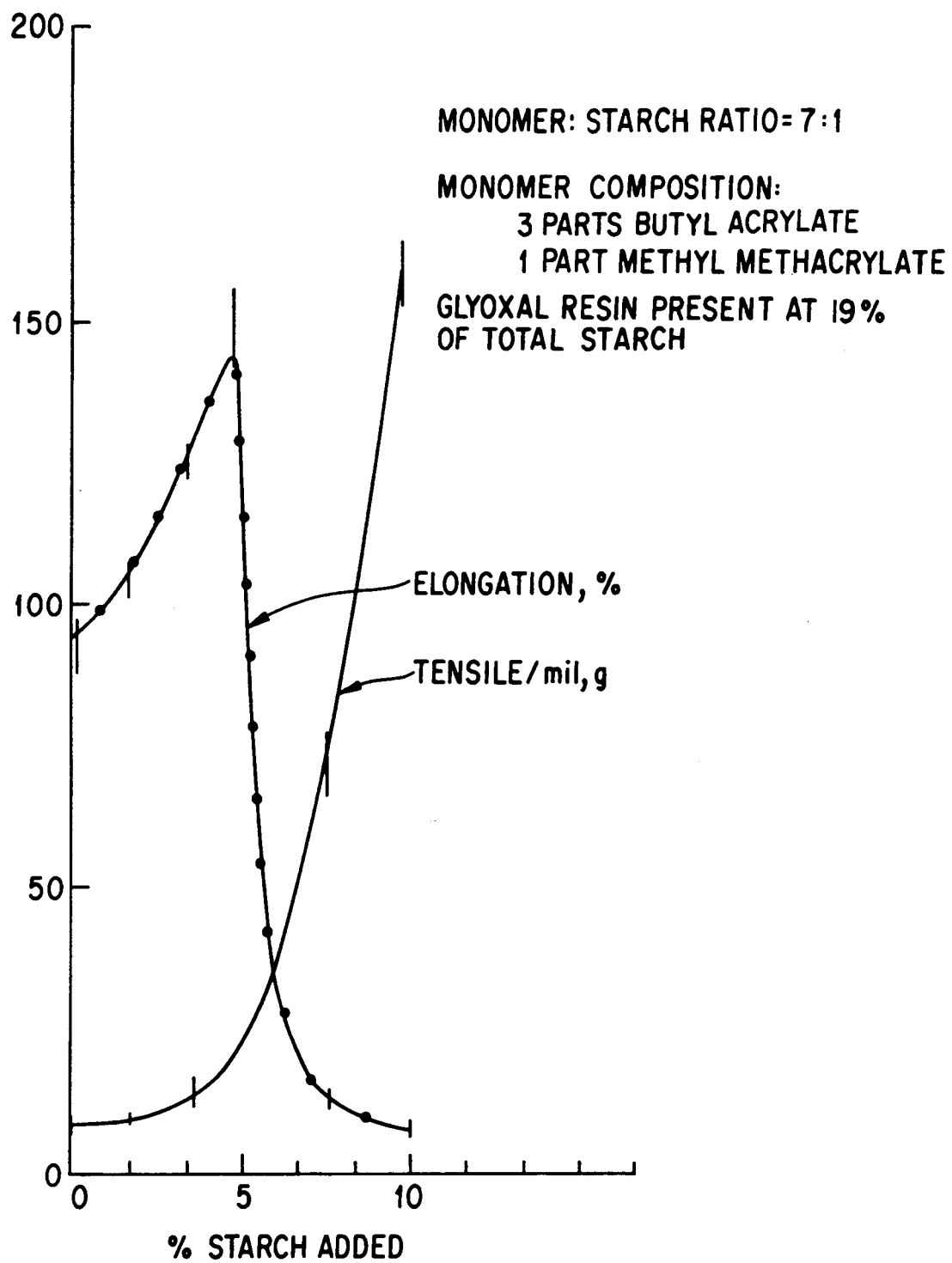
FIG. 1 illustrates the tensile strength and elongation of polymer films produced according to Example V of the invention.
Figure 2:
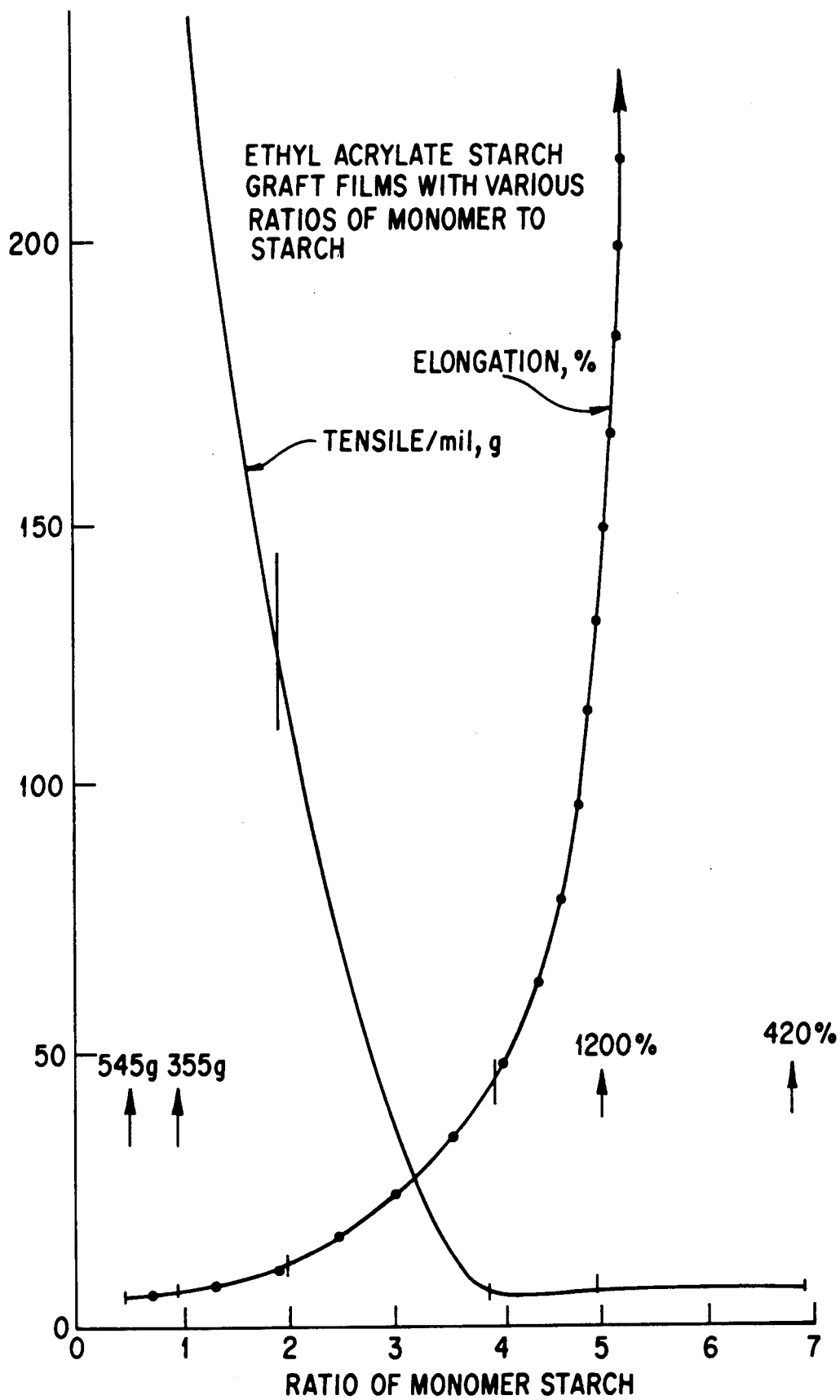
FIG. 2 illustrates the tensile strength and elongation properties of polymer films produced in accordance with Example VI of the invention.

Stable, fluid aqueous emulsions without the need of surfactants are prepared by grafting monomers onto certain starch hydrolyzates. Films can be prepared by casting and drying these emulsions. The emulsions can have a high solids content, typically up to 50% solids, and generally exhibit a higher surface tension than conventional latexes and are compatible with other starches and starch derivatives, both with or without starch-reactive crosslinking resins. The aqueous emulsions prepared according to the present invention contain small particles, generally less than 400 nm, in which agglomeration, coagulation and precipitation is inhibited. The aqueous emulsions of this invention also flow readily, i.e. they have a viscosity of less than 1000 cps, preferably less than 500 cps and optimally less than 250 cps, when measured at 30% solids, at room temperature and with a Brookfield viscometer (#3 spindle at 100 rpm).

The particular low molecular weight starch hydrolyzate is critical to the stability and other characteristics and properties of the resultant starch-polymer graft and aqueous emulsion containing such graft. The starch hydrolyzate of this invention has a water solubility in excess of 80% by weight at 25° C. and a viscosity equivalent to a DE of 1-20, but preferably has a water solubility of at least 86% and a viscosity equivalent to a DE of 1-10 to obtain an aqueous emulsion with increased stability, decreased precipitation and improved fluidity without the use of surfactants, as well as reduced particle size.

The low molecular weight starch hydrolyzate suitable for use in this invention can be obtained from a variety of starches and starch derivatives. Suitable starches include corn, waxy corn, milo, white milo, wheat, potato and tapioca. A preferred starch source is waxy maize because of reduced levels of sedimentation. Starch derivatives that can be used to prepare suitable low molecular weight starch hydrolyzates include hydroxyethyl starch ether, starch acetate, starch phosphate, starch maleate, starch propionamide, cationic starch, oxidized starch and cyanoethyl starch. However, the invention is not limited to these. Other derivatives are also applicable. Methods for the conversion of starch and starch derivatives to the low molecular weight starch hydrolyzates suitable for this invention are known in the art. They include acid, enzyme, acid/enzyme, enzyme/enzyme converted starches and starch derivatives. Also included are certain dextrins (white dextrins, canary dextrins and British gums), thermochemically converted starches, and oxidized starches. Preferred starch conversion products are maltodextrins and dextrins. Generally the starch hydrolyzate prior to grafting has a viscosity of less than 2000 cps, preferably less than 1500 cps, when measured at 40% solids and at room temperature with a Brookfield viscometer (#3 spindle, 100 rpm).

Particularly preferred are maltodextrins that have a DE within the range of about 2 to 10. Commercial maltodextrins are usually refined so that all insoluble carbohydrates and non-carbohydrate materials are removed. These refined maltodextrins are particularly desirable since aqueous emulsions of the starch-polymer grafts are stable, remain fluid and can be stored several months without significant sediment settling.

The preferred monomers used in the grafting reaction, particularly when a stable aqueous emulsion is sought, are hydrophobic olefinically unsaturated monomers and include but are not limited to vinyl monomers, acrylic monomers, styrene monomers, methacrylic monomers and mixtures of the foregoing. Hydrophobic monomers are generally those which have a solubility of less then 10 grams in 100 milliliters of water at 20° C. For satisfactory aqueous emulsion stability generally at least 50%, preferably at least 85% by weight of the monomers are hydrophobic. Suitable hydrophobic monomer for making homopolymer or copolymer grafts include methyl acrylate, ethyl acrylate, propyl acrylate, butyl acrylate, 2-ethylhexyl acrylate, hydroxypropyl acrylate, methyl methacrylate, ethyl methacrylate, vinyl acetate and styrene and mixtures thereof. The monomer mix may contain hydrophilic monomers, preferably up to 15% by weight, of monomers such as acrylic acid, methacrylic acid, hydroxyethyl acrylate, acrylonitrile, quaternary salts of dimethylaminoethyl, methacrylate and the like.

The ratio of monomer to starch (by weight) may be varied from about 1:50 to about 15:1, preferably from about 1:1 to about 7:1. Varying the monomer to starch ratio causes the properties of the resulting polymer film to vary greatly. Generally, high maltodextrin content, for example one having a monomer to maltodextrin ratio below about 2:1 produces films having high tensile strength and low elongation. Low maltodextrin content, for example a ratio above about 5:1 produces films with lower tensile strength and higher elongation.

The starch-polymer graft of the present invention may be additionally processed before or after grafting the monomer onto the starch hydrolyzate. The properties of the film may be modified by a pre or post graft polymerization to form an interpenetrating polymer network. A pre-graft polymerization, process would comprise forming a first crosslinked polymer emulsion; mixing a second monomer emulsion and the starch hydrolyzate, as discussed above, with the first polymer emulsion; allowing the emulsion mixture to equilibrate; and then carrying out the starch-monomer grafting reaction and polymerizing the emulsion mixture providing a first polymer network which is intertwined on a molecular scale with a second starch-polymer graft network. A post-graft polmerization to form an interpenetrating polymer network would modify the above by forming the first crosslinked polymer emulsion with the starch-polymer graft emulsion, then mixing in a second monomer emulsion, allowing the emulsion mixture to equilibrate and then polymerizing the second monomer. The disclosure of U.S. Pat. No. 4,616,057 regarding forming an interpenetrating polymer network is incorporating herein by reference.

In addition other starches (even those which do not afford self-emulsifying grafts) may be added into the emulsion after grafting to add to the tensile strength, elongation resistance or other desired properties for films prepared from the emulsion. After grafting, the polymer substituents of the starch graft may be further polymerized, or the starch portion may be further reacted with other starches including higher molecular weight starches, or other starches may be merely mixed into the emulsion.

Additionally, the starch hydrolyzate may be further reacted, before or after grafting, with a crosslinking agent or resin. The crosslinking agent may be a formaldehyde-based agent such as urea formaldehyde resins, glyoxal, formaldehyde resins (monourein derivatives) or melamine formaldehyde resins, but preferably is a non-formaldehyde starch crosslinking agent, preferably a glyoxal compound such as glyoxal or a blocked glyoxal resin as described in U.S. Pat. No. 4,695,606. The crosslinking agent may be added at about 0.1 to 25% based on the weight of the starch.

The preparation of the starch-polymer graft and the stable, fluid aqueous emulsion is dependent upon a particular grafting reaction wherein ring cleavage occurs between carbons 2 and 3 in the anhydro-glucose ring of the starch.

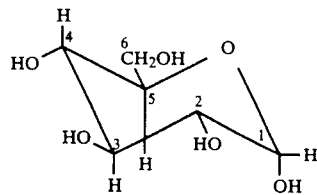

In addition to carrying out this grafting reaction, a suitable catalyst is determined by its ability to generate a high proportion of initiation sites on the starch backbone as opposed to generating initiation sites in the aqueous phase. Ceric salts ($Ce^{IV}$), preferably ceric ammonium nitrate, meet this requirement. The preferred pH for the reaction with a ceric salt is 1.5–2.5. A temperature of less than 50° C. is preferred, especially a temperature of 25°–40° C. as higher temperatures at this low pH can degrade the starch. Nitric acid is preferred for lowering pH when ceric ammonium nitrate is used.

Alternatively, ring cleavage and grafting initiation can be carried out using separate reagents, i.e. the anhydro-glucose ring can first be cleaved using periodic acid or other periodate or permaganate, followed by utilizing an initiation catalyst, such as a persulfate.

The starch graft may be prepared by a single feed process whereby all of the monomer is charged to a starch solution, and catalyst is added slowly, preferably over a period of about 30 minutes to about 6 hours. Polymerization may also be accomplished by a dual feed process wherein monomer and catalyst are fed simultaneously into the starch solution over an extended period. Additionally, a second polymerization may be carried out by adding additional monomers and conventional catalyst to the starch-polymer graft. Depending on the technique, a core-shell or interpenetrating polymer network may then be formed.

Preparation of a starch graft in accordance with the invention may be accomplished by charging water and an appropriate starch hydrolyzate into a reaction vessel. The initial solids content is preferably from about 20-50% by weight. In order to thoroughly disperse the starch hydrolyzate, the aqueous solution is preferably heated and stirred for a short period, preferably keeping the temperature below the boiling point of water. After the solution cools somewhat, the monomers to be grafted are charged into the reaction vessel. A catalyst solution is preferably added either subsequent to or substantially simultaneous with the addition of monomer.

Preferably, the catalyst comprises from about 0.1% to about 10% by weight of the monomer, most preferably from about 2% to about 4%. The catalyst solution is preferably added over a period of at least 30 minutes and preferably from about 1 to 2 hours. It is desirable to achieve a high molecular weight product while maintaining small particle size. By adding monomer and catalyst over a period of time, temperature rise may be closely regulated and maintained, preferably below about 37° C., and the resulting polymer will have a high molecular weight consistent with small particle size. Under more strenuous conditions where monomer and/or catalyst are added all at once, a lower molecular weight may result, as well as a much less uniform molecular weight range for the solid particles. Some of these reactions are highly exothermic and may require dual feeding of reactants to control the reaction. After all monomer and catalyst additions, and preferably after about 1½ to 2 hours of reaction time, a finishing catalyst is added. Appropriate finishing catalysts include but are not limited to ferrous sulfate, t-butyl hydroperoxide, sodium bisulfite, ferrous ammonium sulfate, hydrogen peroxide and sodium formaldehyde sulfoxylate. The batch is then briefly heated to consume residual monomer, then cooled and neutralized.

The starch-polymer graft thus prepared advantageously will provide a stable, fluid aqueous emulsion even at high solids contents of up to 30 to 50% without the use of surfactants. The average particle size of the graft is generally less than 400 nm, as measured on a Coulter Counter with a light scattering detector, and agglomeration, coagulation and precipitation from the emulsion is inhibited. Advantageously, the emulsion flows readily such that the viscosity is less than 1000 cps, preferably less then 500 cps and optimally less then 250 cps as measured at 30% solids at 25° C. by a Brookfield viscometer (#3 spindle, 100 rpm). Uniquely, the aqueous emulsion obtained exhibits a high surface tension typically of 50-55 dynes/cm$^2$, as opposed to 25-40 dynes/cm$^2$ for a typical vinyl or acrylic emulsion containing surfactant. The benefit of a high surface tension is that coatings containing the emulsion will stay on the surface rather than soaking the substrate and if desired surfactants could be added to lower the surface tension.

The following Examples I-XV generally illustrate certain embodiments of the invention, but should not be considered as limitations thereof.

EXAMPLE I

To a 2-liter resin kettle equipped with mechanical agitator, thermometer, sparge tube, addition tubes and condenser was added 1107 g of deionized water. One hundred eighty grams of maltodextrin (average mw approximately 3600 daltons, dextrose equivalent of 5) was added to the kettle and heated to 70° C. for 10 minutes to form a clear solution in which the maltodextrin was totally dissolved. As the reaction was cooled to room temperature, a nitrogen sparge was started. At 27° C., a mixture of 360 g of methyl methacrylate containing 0.18 g of triallyl cyanurate (TAC) was added all at once. At 21° C. the catalyst solution containing 10.8 g of ceric ammonium nitrate (CAN) in 180 g of 1.0N HNO$_3$ (at a pH of 2) was slowly charged through the addition tube by means of a syringe pump. The catalyst was added over 40 minutes. During the early portion of the catalyst addition the temperature rose to 26° C. After stirring for 1.5 hours at 26° C., a finishing catalyst was added consisting of 1 cc of 1% ferrous sulfate, 1 g of t-butyl hydroperoxide and 0.5 g of sodium formaldehyde sulfoxylate. The batch was heated briefly to 42° C. to consume any residual free monomer, then cooled and neutralized with concentrated ammonium hydroxide to a pH of 7.3. A biocide was added to prevent spoilage. The starch-polymer graft product was a white emulsion with only a trace of grit obtained by filtration on a 200 mesh filter. The particle size was 259 nm and the viscosity at 30% solids, and at room temperature (Brookfield RV, #3 spindle at 100 rpm) was 50 cps.

EXAMPLE II

The formulation and equipment used in Example I was used in this example except that the monomer solution contained ethyl acrylate instead of methyl methacrylate and the monomer and catalyst solution were slowly added over 40 minutes, with the temperature rising to between 26° C. and 27° C. A finishing catalyst was added as before, the emulsion neutralized, and biocide added. No grit was found upon filtering the starch-polymer graft emulsion and the particle size was 311 nm. Viscosity was 45 cps measured as in Example I.

EXAMPLE III

An interpenetrating polymer network of cross-linked silicone oil was prepared as follows. A monomer solution was prepared by dissolving 0.45 g of TAC in 268.5 g of ethyl acrylate. To this ethyl acrylate solution was added 30 g of a low molecular weight hydroxyl-terminated poly-dimethyl siloxane oil, and 3 g of methyl trimethoxy silane. A catalyst solution was prepared by dissolving 0.15 g of dibutyl tin dilaurate in 1.5 g of ethyl acrylate. The catalyst was slowly added to a stirred solution of the ethyl acrylate-silicone oil mixture and allowed to stir for two days at room temperature. This produced a cross-linked silicone oil dissolved in the ethyl acrylate for use in the following starch graft.

To a 1 liter resin kettle equipped with a mechanical stirrer, thermometer, sparge tube, condenser and two addition funnels was added 480 g of deionized water, 4.8 g of a cyclic urea-glyoxal condensate (a 1:2 molar ratio of urea to glyoxal) such as described in U.S. Pat. No. 4,695,606 and 78.1 g of a maltodextrin (DE of 5). The kettle contents were heated to 90° C. for 30 minutes and then cooled under a nitrogen sparge to 20°-22° C. The pH of the starch solution was adjusted to 2.0 with 6.5 g of concentrated nitric acid. A catalyst solution was prepared by dissolving 4.64 g of ceric ammonium nitrate in 78 g of deionized water, and placed in an addition funnel. The monomer solution containing the ethylacrylate, TAC, and cross-linked silicone oil was charged to a second addition funnel. Both funnel charges were added dropwise over a 50 minute time period. The reaction was allowed to stir one hour at 20°-22° C., whereupon the pH was adjusted from 1.8 to 6.5 with 25% sodium hydroxide.

Inspection disclosed a minute mist of oil droplets on the surface of the emulsion (considerably less than the 2.0% silicone oil contained in the product). The emulsion was homogenized with 1000 psi on the second stage and 2500 psi on the first stage. The final product was a white emulsion with no oiliness visible after standing 48 hours. The particle size was less than 350 nm and the viscosity was less than 50 cps, measured as in Example I.

EXAMPLE IV

An interpenetrating polymer network with styrene was prepared as follows. A 250 ml 3-necked flask was fitted with a mechanical stirrer, thermometer, nitrogen sparge and condenser. To this flask was added 208 g of the starch-polymer graft product of Example I. Styrene (12.5 g) containing 0.05% TAC and 0.5 g of azobis isobutyronitrile was added to the stirred emulsion and allowed to stir under nitrogen at room temperature for one hour. Styrene was present at a level of 30% of the methylmethacrylate polymer contained in the graft. The reaction was heated to 75°–80° C. for 3 hours with a gentle nitrogen sparge. Upon cooling the emulsion was filtered with a less than 0.05 g of grit. The particle size was 300 nm and the viscosity was 50 cps, measured as in Example I.

EXAMPLE V

A high molecular weight starch was incorporated as follows. As specified in Example II a starch-polymer graft was prepared except the monomer mix was 3 parts by weight butyl acrylate, one part methyl methacrylate, and 0.05% TAC. Starch was grafted with seven parts monomer per part of starch, for an emulsion of 30% solids. A 200 g sample of this emulsion was placed into a 250 ml 3-necked flask equipped with a mechanical stirrer, thermometer and condenser. Ten grams (5%) of Polaris Gum LV ® from Penford Products Company (an oxidized, ethoxylated potato starch having an alkali fluidity at 20 grams of 45 to 55 ml) and 1.9 g of a cyclic urea-glyoxal condensate as mentioned in Example III, were added with stirring. The reaction was heated to 90° C. for 30 minutes, then cooled and filtered. Less than 0.1 g of grit was found in the filter. This procedure was repeated in which the starch was added to the emulsion in the following amounts: 1.87%, 3.75%, 7.5% and 10% and the cyclic urea-glyoxal condensate was added at a level of 19% by dry weight of the total starch content. Films were cast of these samples and air dried. The films were then tested for tensile and elongation. Results are shown in FIG. 1. Viscosities ranged from 50 to 230 cps, measured as in Example I.

The emulsions were compared to conventional latexes. Sample A was a copolymer of 1 part of vinyl acetate and 3 parts n-butyl acrylate with 5% N-methylol acrylamide as a crosslinking agent. Sample B was a vinyl acetate homopolymer. As Sample A was heating with the Polaris Gum LV starch and cyclic urea-glyoxal condensate at 85°–90° C. and at 30% solids it became a thick creamy paste as the N-methylol acrylamide crosslinked. On a second attempt, the starch and resin were cooked separately and cooled before adding to Sample A. Upon standing overnight Sample A separated. Sample B was also reacted with the starch and cyclic urea-glyoxal condensate at 30% solids. Upon standing overnight, the sample separated.

The starch-polymer grafts show the advantage of being compatible with starch solutions whereas many conventional latexes are not. Incorporation of starch has the benefits of increasing tensile strength and reducing elongation.

EXAMPLE VI

A series of starch grafts were prepared in which the monomer/starch ratio was varied from 0.5:1 to 7.0:1. The monomer was ethyl acrylate containing 0.05% TAC. The starch-polymer grafts were prepared by the procedure of Example II. Films were cast and tested for tensile and elongation. Results are shown in FIG. II.

COMPARATIVE EXAMPLE VII

To a 2 liter resin kettle equipped with sparge tube, thermometer and condenser was charged 875 g of de-ionized water and 104 g of Stadex ®15, a dextrin of low conversion available from A. E. Staley, described as a white dextrin with 13–18% water solubility. The dextrin was heated to 90° C. for 30 minutes, then was cooled under a nitrogen sparge to 25° C. While cooling, a catalyst solution was prepared by mixing 16.6 g of ceric ammonium nitrate with 277 g of 1N $HNO_3$. Ethyl acrylate (416 g) was charged to an addition funnel. Catalyst and monomer were charged simultaneously over one hour with temperature ranging from 23° C. to 26° C. The reaction was stirred 30 minutes and pH wa adjusted to 7.0 with 25% caustic soda. The product was very grainy and would not filter through a 50 mesh sieve. Particles were larger than 0.5 mm.

COMPARATIVE EXAMPLE VIII

A high fluidity oxidized starch (Staco M from A.E. Staley Mfg. Co.), and then an acid modified starch (Keofilm 90 from Hubinger Co.) were grafted. Prior to grafting, both of these starches produce gels at 40% solids and at room temperature. The same procedure as in Example VII was repeated replacing the dextrin with the starches. The results were similar to Example VII. The products were grainy and would not filter.

EXAMPLE IX

The procedure in Example VII was repeated using a moderately converted British gum (Amazio ® 1620 Dextrin, a waxy dextrin having a 80–100% water solubility and with a viscosity at 40% solids of 1000 cps) as the grafting substrate. The resulting product was a thick, creamy white emulsion which filtered through a 100 mesh bag with less than 0.2% grit. At 30% solids, the room temperature viscosity was 975 cps (Brookfield RV, #3, 100 rpm).

COMPARATIVE EXAMPLE X

The procedure in Example VII was repeated using corn syrup solids having a dextrose equivalent of 43.5 and water solubility of 100% (Star-Dri ® 42R available from A. E. Staley) as the grafting substrate. The polymerization caused significant and unacceptable quantities of coagulum to develop on the agitator, sparge tube and thermometer. The product readily filtered, but 1.5% of the batch charged was retained by a 100 mesh bag as coagulum. A film was cast of this product and was found to be tacky and unacceptable. Starch-polymer grafts of Example IX and others using maltodextrins do not form tacky films under these conditions.

EXAMPLE XI

The procedure in Example VII was repeated using a highly converted, low viscosity canary dextrin (Amaizo ® 1895 Dextrin, a canary dextrin having a water solubility of 96%+ from American Maize) as the grafting substrate. The resulting product was a thin, white emulsion which readily filtered through a 200 mesh screen with less than 0.1% grit. At 30% solids, the room temperature viscosity was 20 cps (Brookfield RV, #3 spindle at 100 rpm). The particle size was 156 nm.

EXAMPLE XII

To demonstrate benefit of ring cleavage between carbons 2 and 3 of the anhydro-glucose ring of the starch hydrolyzate, the following reactions were carried out.

| Component (parts/weight) | A | B | C |
|---|---|---|---|
| Deionized Water | — | — | 50 |
| Periodic Acid | — | — | 4.6 |
| Deionized Water | 350 | 350 | 300 |
| Stadex ® 79 | 120 | 120 | 120 |
| Ferrous Ammonium Sulfate | 0.1 | — | 0.1 |
| Ethyl Acrylate | 280 | 280 | 280 |
| Ammonium Persulfate | 11.2 | — | 11.2 |
| Deionized Water | 60 | 60 | 60 |
| Ceric Ammonium Nitrate | — | 11.2 | — |
| Conc. Nitric Acid | — | 1.0 | — |
| 45% Potassium Hydroxide | — | 6.5 | 4.5 |
| Biocide | 0.1 | 0.1 | 0.1 |

Reactions A and B were set up to be identical except for the catalyst. Reaction A was to be initiated by persulfate redox reactions. Reaction B was to be initiated by ceric ammonium nitrate. In both reactions, the Stadex ®79 (a high conversion white dextrin from A.E. Staley Company having a water solubility of 75-85%) was added to a resin kettle containing the deionized water. The reactions were heated to 90° C. for 30 minutes, affording a pale translucent yellow product, then cooled to the appropriate reaction temperature.

For Reaction A, the kettle was cooled to 48° C. with a strong nitrogen sparge, and 0.1 g of ferrous ammonium sulfate was added. The etnyl acrylate was charged to an addition funnel as was the ammonium persulfate solution. The monomer and catalyst feeds were added simultaneously over 41 minutes with the reaction temperature being maintained between 50° and 55° C. When the additions of Reaction A were complete, the product was a thick, white past. It was too thick to pour, and was shoveled from the kettle into a jar using a scoop. Biocide was added. Viscosity (Brookfield RV, #7, 50 rpm) was approximately 50,000 cps.

For Reaction B, the kettle was cooled under a nitrogen sparge to 25° C. The product was a pale, translucent yellow just as Reaction A had been at this point. The pH was adjusted to 1.8 with nitric acid. The ethyl acrylate and ceric catalyst were each charged to an addition funnel and added simultaneously over 43 minutes. The reaction temperature was maintained between 24° and 26° C. The pH was raised from 1.7 to 7.0 with 45% KOH, and biocide added. The product was a thin white emulsion which filtered through a 150 micron bag with no grit. Viscosity (Brookfield RV, #3, 100 rpm, room temperature) was 110 cps. After 5 days, viscosity was 100 cps. Reaction A remained gel after 5 days.

Another major difference between A and B is the mechanism of initiation. With persulfate, the anhydroglucose units of the starch remain intact. With ceric ion, the anyhdro-glucose units are oxidatively cleaved between carbons 2 and 3. It is theorized that a minor amount of ring cleavage could impart more conformational mobility to a starch polymer, and could also disrupt the cyrstallinity and packing of the starch molecules, which would lessen the degree of hydrogen bonding. This could be expected to promote lower viscosity.

Reaction C supports this theory. A starch solution similar to that in Reactions A and B was gelatinized and treated with an amount of periodic acid that was a molar equivalent to the amount of cerium used in Reaction B. Periodic acid is known to selectively cleave the bond between the C-2 and C-3 glycol unit in starch to produce an acyclic dialdehyde as this is the procedure used commercially to prepare dialdehyde starch. After gelatinization, the starch was cooled to room temperature and the periodic acid solution was slowly added. After stirring for 3 hours under a nitrogen sparge the pH was raised from 1.6 to 4.0. The temperature was raised to 50° C. and the ferrous ammonium sulfate was added. Monomer and the persulfate catalyst were fed simultaneously over 45 minutes. After two hours, the product was a white emulsion with a viscosity of 185 cps (room temperature, Brookfield RV, #3, 100 rpm). This would indicate that diol cleavage of at least a small number of anhydro-glucose units is desirable when preparing a high solids, low viscosity starch-polymer graft. Cleavage may be done prior to grafting with a non-cleaving catalyst, but it is more efficient and preferred to use a catalyst that also cleaves the starch glycol group.

EXAMPLE XIII

A starch-polymer graft is prepared for use as a hand-builder for textiles as follows. To a 2 liter resin kettle equipped with a mechanical agitator, thermometer, sparge tube, addition tubes and condenser were added 1136 grams of deionized water and 100 grams of a maltodextrin (DE of 5). The kettle was heated with stirring up to 90° C. and held for 30 minutes. As the reaction was cooled to 25° C., a nitrogen sparge was started.

A monomer mix consisting of 150 grams ethyl acrylate, 150 grams methyl methacrylate and 0.15 grams triallylcyanurate (TAC) was made. A catalyst mix was also made of 9 grams ceric ammonium nitrate (CAN) and 150 grams of 1N nitric acid solution. Both monomer mix and catalyst were fed from addition funnels over a period of 50 minutes. The monomer flow rate was 7 ml/min. and the catalyst flow rate was 3 ml/min. The temperature was maintained at 22°-25° C. by a ice bath until the addition were finished. After the additions, the temperature was held at 30° C. for 30 minutes. At that time a finishing catalyst consisting of 1 gram of 1% ferrous sulfate, 1 gram tertiary butyl hydroperoxide and 0.5 grams of sodium formaldehyde sulfoxylate was added to react any residual monomer. After 10 minutes the pH was adjusted to 7.4 with 25% potassium hydroxide, and a biocide was added. This provided a stable milky emulsion containing 24% solids having a viscosity of 50 cps and a particle size of 280 nm.

EXAMPLE XIV

The procedure in Example XIII was repeated with one substitution and the following procedural changes. The ethyl acrylate was replaced with butyl acrylate with all amounts kept the same. Before the addition began, an initial catalyst of 5 grams of the catalyst solution and initial monomer of 20 grams of monomer mix were added. Throughout the 50 minute feed time, the temperature ranged from 25°-31° C.

After the addition was finished the temperature was raised to 40° C. The finishing catalyst was added and the temperature held for 1 hour. The reaction was cooled to 30° C. and the pH adjusted to 7.2 with 25% potassium hydroxide. Finally a biocide was added. This obtained a stable, milky emulsion containing 24% solids having a viscosity of 45 cps and a particle size of 210 nm.

EXAMPLE XV

A pad bath was prepared by mixing 100 grams of Permafresh®ULC (a magnesium chloride/organic acid precatalyzed DMDHEU/glycol permanent press reactant from Sequa Corporation) and either 50 grams or 100 grams of each of Examples XIII and XIV. To this was added 20 grams of Mykon®HD (a 25% aqueous polyethylene emulsion from Sequa Chemicals Inc.) and the whole mix was made up to 1000 grams. A control mix with no added starch-polymer graft was also made for control purposes.

Swatches of three fabrics, a one hundred percent cotton broadcloth, a 100% rayon challis and a 65/35 polyester/cotton blend shirting material were impregnated by immersion in the pad bath and squeezed through a 2 roll pad. Fabrics were subsequently dried for 4 minutes at 225° F. and then cured for 60 seconds at 350° F.

The fabrics so treated were evaluated for handle. The fabrics treated with the starch-polymer graft had an improved tactile feel described as fuller, weightier and more luxurious than the control sample and thus useful as handbuilders for textile fabrics. Similar improvement in handle over control was noted after the fabric had been subjected to 5 automatic home launderings in a washing machine with a water temperature of 120° F.

While certain representative embodiments and details have been shown for the purpose of illustrating the invention, it will be apparent to those skilled in this art that various changes may be made therein without departing from the spirit or scope of the invention as defined by the following claims.

What is claimed is:

1. A starch-polymer graft composition comprising a starch hydrolyzate having a water solubility in excess of 80% by weight at 25° C. and a viscosity equivalent to a dextrose equivalent of 1-20, a polymer based on a monomer containing a hdyrophobic olefinically unsaturated monomer, wherein said starch hydrolyzate includes at least one millimole of graft sites per mole of starch hydrolyzate where the polymer is bound to said starch hydrolyzate to form the starch-polymer graft, and wherein during or prior to a grafting reaching which forms the graft the anhydro-glucose ring of the starch hydrolyzate is cleaved between carbons 2 and 3.

2. The composition of claim 1, wherein said composition is an aqueous emulsion having no added surfactant.

3. The composition of claim 2 wherein the starch hydrolyzate has a water solubility in excess of 86%.

4. The composition of claim 3 wherein the starch hydrolyzate has a viscosity equivalent to a dextrose equivalent of 1-10.

5. The composition of claim 4, wherein the starch hydrolyzate is a maltodextrin.

6. The composition of claim 1, wherein the starch hydrolyzate is a maltodextrin having a dextrose equivalent of 2-10.

7. The composition of claim 2, wherein the polymer is based on a monomer which contains at least 50% by weight of a hydrophobic, olefinically unsaturated monomer.

8. The composition of claim 6, wherein the polymer is based on a monomer which contains at least 85% by weight of a hydrophobic, olefinically unsaturated monomer.

9. The composition of claim 8, wherein the hydrophobic monomer is selected from the group consisting of vinyl, acrylic, styrene and methacrylic monomers, and mixtures thereof.

10. The composition of claim 9, wherein the starch hydrolyzate includes at least 10 millimoles of graft sites per mole of starch hydrolyzate.

11. The composition of claim 10, wherein said starch hydrolyzate before grafting has a viscosity of less than about 2000 centipoise in a room temperature aqueous solution at a solids content of 40% by weight.

12. The composition of claim 2 wherein the aqueous emulsion has a viscosity of less than 1000 cps when measured at 30% solids, at room temperature and with a Brookfield viscometer with a #3 spindle at 100 rpm.

13. The composition of claim 4 wherein the aqueous emulsion has a viscosity of less than 500 cps when measured at 30% solids, at room temperature and with a Brookfield viscometer with a #3 spindle at 100 rpm.

14. The composition of claim 8 wherein the aqueous emulsion has a viscosity of less than 250 cps when measured at 30% solids, at room temperature and with a Brookfield viscometer with a #3 spindle at 100 rpm.

15. The composition of claim 13 wherein the starch hydrolyzate is obtained from waxy maize.

16. The composition of claim 9 wherein the monomer is selected from the group consisting of methyl acrylate, ethyl acrylate, propyl acrylate, butyl acrylate, 2-ethylhexyl acrylate, hydroxypropyl acrylate, methyl methacrylate, ethyl methacrylate, vinyl acetate, styrene and mixtures thereof.

17. The composition of claim 2 further comprising a crosslinking agent.

18. The composition of claim 17 wherein the crosslinking agent is a glyoxal compound.

19. A method for preparing a starch-polymer graft composition comprising the step of grafting in an aqueous solution at least one monomer containing a hydrophobic olefinically unsaturated monomer to a graft site of a starch hydrolyzate having a water solubility, prior to grafting, in excess of 80% by weight of 25° C. and a viscosity equivalent to a dextrose equivalent of 1-20, wherein said grafting reaction is effective to produce at least about one millimole of graft sites per mole of said starch hydrolyzate and during or prior to said grafting reaction the anhydro-glucose ring of the starch hydrolyzate is cleaved between carbons 2 and 3.

20. The method of claim 19, wherein the catalyst for the grafting reaction is a ceric salt and the anyhdroglucose ring is cleaved during the grafting reaction.

21. The method of claim 20 wherein the catalyst is ceric amonium nitrate and grafting is carried out at a pH of 1.5 to 2.5.

22. The method of claim 19, wherein said grafting is achieved by charging starch hydrolyzate into a reaction vessel, and subsequently charging said monomer and said initiator simultaneously.

23. The method of claim 19, wherein said charging of monomer or initiator occurs at a constant flow rate over a period between about 30 minutes and about 4 hours.

24. The method of claim 19, wherein said grafting is accomplished by sequentially charging to a reaction vessel said hydrolyzate, said monomer, and said initiator.

25. The method of claim 19, further comprising adding additional monomer after grafting.

26. The method of claim 19, wherein the total weight of catalyst added is between about 0.5% and about 10%, based on the total weight of monomer.

27. The method of claim 21, wherein the total weight of catalyst added is between about 2% and about 4%, based on the total weight of monomer.

28. The method of claim 19 wherein the starch hydrolyzate has a water solubility in excess of 86%.

29. The method of claim 28 wherein the starch hydrolyzate has a viscosity equivalent to a DE of 1-10.

30. The method of claim 29 wherein the starch hydrolyzate is a maltodextrin.

31. The method of claim 19 wherein the starch hydrolyzate is a maltodextrin having a DE of 2-10.

32. The method of claim 28 wherein the polymer is based on a monomer which contains at least 50% by weight of a hydrophobic, olefinically unsaturated monomer.

33. The method of claim 31 wherein the polymer is based on a monomer which contains at least 85% by weight of a hydrophobic, olefinically unsaturated monomer.

34. The method of claim 33 wherein the hydrophobic monomer is selected from the group consisting of vinyl, acrylic, styrene and methacrylic monomers, and mixtures thereof.

35. The method of claim 34 wherein the starch hydrolyzate includes at least 10 millimoles of graft sites per mole of starch hydrolyzate.

36. The method of claim 35 wherein said starch hydrolyzate before grafting has a viscosity of less than about 2000 centipoise in a room temperature aqueous solution at a solids content of 40% by weight.

37. The method of claim 19 wherein an aqueous emulsion is prepared which has a viscosity of less than 1000 cps when measured at 30% solids, at room temperature and with a Brookfield viscometer with a #3 spindle at 100 rpm.

38. The method of claim 29 wherein an aqueous emulsion is prepared which has a viscosity of less than 500 cps when measured at 30% solids, at room temperature and with a Brookfield viscometer with a #3 spindle at 100 rpm.

39. The method of claim 33 wherein an aqueous emulsion is prepared which has a viscosity of less than 250 cps when measured at 30% solids, at room temperature and with a Brookfield viscometer with a #3 spindle at 100 rpm.

40. The method of claim 38 wherein the starch hydrolyzate is obtained from waxy maize.

41. The method of claim 34 wherein the monomer is selected from the group consisting of methyl acrylate, ethyl acrylate, propyl acrylate, butyl acrylate, 2-ethylhexyl acrylate, hydroxypropyl acrylate, methyl methacrylate, ethyl methacrylate, vinyl acetate, styrene and mixtures thereof.

42. The method of claim 19 further comprising adding a crosslinking agent.

43. The method of claim 42 wherein the crosslinking agent is a glyoxal compound.

44. A polymeric film prepared by casting and drying the composition of claim 19.

45. Product prepared by the process of claim 19.

46. A textile product prepared by applying the starch polymer graft, prepared by the process of claim 19.

* * * * *